US008332757B1

(12) United States Patent
Davey et al.

(10) Patent No.: US 8,332,757 B1
(45) Date of Patent: Dec. 11, 2012

(54) VISUALIZING AND ADJUSTING PARAMETERS OF CLIPS IN A TIMELINE

(75) Inventors: Matthew Davey, Groton, MA (US); Sven Duwenhorst, Hamburg (DE)

(73) Assignee: Adobe Systems Incorporated, San Jose, CA (US)

( * ) Notice: Subject to any disclaimer, the term of this patent is extended or adjusted under 35 U.S.C. 154(b) by 423 days.

(21) Appl. No.: 12/565,528

(22) Filed: Sep. 23, 2009

(51) Int. Cl.
*G06F 3/00* (2006.01)
*G06F 3/16* (2006.01)

(52) U.S. Cl. .................. 715/716; 715/723; 715/727

(58) Field of Classification Search .............. 715/716, 715/727, 723
See application file for complete search history.

(56) References Cited

U.S. PATENT DOCUMENTS

| | | | | |
|---|---|---|---|---|
| 5,404,316 A | * | 4/1995 | Klingler et al. | 715/723 |
| 5,682,326 A | * | 10/1997 | Klingler et al. | 715/202 |
| 2001/0040592 A1 | * | 11/2001 | Foreman et al. | 345/723 |
| 2003/0030661 A1 | * | 2/2003 | Miyauchi et al. | 345/723 |
| 2006/0180007 A1 | * | 8/2006 | McClinsey | 84/645 |
| 2008/0080721 A1 | * | 4/2008 | Reid et al. | 381/104 |
| 2010/0278504 A1 | * | 11/2010 | Lyons et al. | 386/52 |
| 2010/0281366 A1 | * | 11/2010 | Langmacher et al. | 715/716 |
| 2010/0281379 A1 | * | 11/2010 | Meaney et al. | 715/723 |

OTHER PUBLICATIONS

"Final Cut Pro User's Manual," Chapter 67, Section 25 [Online] [Retrieved on Sep. 23, 2009] Retrieved from the Internet URL: http://documentation.apple.com/en/finalcutpro/usermanual/index.html#chapter=67%26section=25, 3 pages.
Using Adobe Premiere Pro CS4, Chapter 11, Section: "Adjusting effects" [Online] [Retrieved on Sep. 23, 2009] Retrieved from the Internet URL: http://help.adobe.com/en_US/PremierePro/4.0/premierepro_cs4_help.pdf, 6 pages.

* cited by examiner

*Primary Examiner* — Ting Lee
(74) *Attorney, Agent, or Firm* — Fish & Richardson P.C.

(57) ABSTRACT

Methods, systems, and apparatus, including computer programs encoded on a computer storage medium, for visualizing and adjusting parameters of clips in a timeline. In one aspect, a method includes generating a clip for one or more media elements having parameters, each clip being a visual representation of an associated media element; displaying an interface for representing each clip relative to a timeline; displaying first and second parameter lanes associated with a first clip and having associated first and second parameter lane control elements; receiving an input modifying one or more of the first and second parameter lane control elements; and adjusting the parameters of the media element associated with the first clip according to one or more properties of the first and second parameter lane control elements.

22 Claims, 6 Drawing Sheets

VISUALIZING AND ADJUSTING PARAMETERS OF CLIPS IN A TIMELINE

BACKGROUND

The present disclosure relates to user interfaces for mixing and editing media elements.

In general, a media element can refer to audio data, video data, audio/video, and other data. Example sources for media elements include audio data from a microphone or the audio circuitry of a personal computer, audio signals from a radio receiver (e.g., in form of an mp3 file), the raw audio data stream of a compact disc drive playing an audio CD, or other types of files or data streams. Audio signals encoded in the media elements can come from different sources and have different adjustable parameters. Examples of parameters of audio signals include volume, intensity, signal type (e.g., mono, stereo), stereo width, panorama, and phase.

Properties of audio data can be edited using a graphical interface containing visual representations of media elements in a timeline environment. A conventional timeline environment can provide a one dimensional linear time-based area within the interface containing the visual representations of media elements. The timeline can be divided into one or more tracks where the tracks correspond to parallel subdivisions of the timeline.

Visual representations of media elements are referred to as clips. Clips can be arranged within the timeline. Additionally, multiple clips can be arranged within one or more tracks of the timeline. In general, there are no restrictions as to the arrangement of the clips, however, multiple clips within a single track typically do not overlap.

Clips can contain references to the source material (e.g., the media element) or they can contain copies of the source material. A clip can contain multiple parameters, each of the parameters associated with a property and/or parameter of the media element.

In general, a clip can contain values for particular effect parameters in the form of one or more control points. The control points contain the values for particular effect parameters associated with a particular point in time in relation to the timeline. Such control points are generally referred to as keyframes, keyframe controls, or keyframe control points. A clip can contain one or more groups of one or more keyframes that are associated with a time index relative to a timeline. A keyframe can contain a particular value for a particular effect parameter and serves as a marker for applying those values to the clip or track at the a specified time. Therefore, each keyframe has a type and a parameter value, and a number of keyframes can be used to convey a time dependent series of parameter value changes. A group of keyframes is part of a clip and, therefore, is also associated with a media element.

The type of a keyframe can indicate specific ways in which parameter value changes are processed. Examples for keyframe types are hold-keyframes and linear, Bézier, or spline interpolation keyframes.

SUMMARY

This specification describes technologies relating to user interfaces for mixing and editing media elements.

In general, one innovative aspect of the subject matter described in this specification can be embodied in methods that include the actions of receiving one or more media elements including audio data, the one or more media elements having associated parameters; generating a clip for each media element, each clip being a visual representation of an associated media element; displaying an interface for representing each clip relative to a timeline; responsive to a first selection of a first audio parameter, displaying in the interface a first parameter lane associated with a first clip and having associated first parameter lane control elements; responsive to a second selection of a second audio parameter, displaying in the interface a second parameter lane while the first parameter lane remains displayed, the second parameter lane being associated with the first clip and having associated second parameter lane control elements; receiving an input modifying one or more of the first and second parameter lane control elements; and adjusting the parameters of the media element associated with the first clip according to one or more properties of the first and second parameter lane control elements. Other embodiments of this aspect include corresponding systems, apparatus, and computer programs, configured to perform the actions of the methods, encoded on computer storage devices.

These and other embodiments can each optionally include one or more of the following features. Each parameter lane is associated with a keyframeable parameter. The keyframeable parameter is selected from the group consisting of intensity, volume, synthesizer, intensity, lead, background, rain, construction, flute, piano, guitar, melody, strings, solo, vocal, oboe, percussion, bells, strings, choir, environment, clarinet, and harmony.

Adjusting the parameters of the media element further includes adjusting the properties of one or more parameter lane control elements in response to an input changing one or more of the properties of one or more parameter lane control elements. Adjusting the properties of the one or more media elements further includes changing one or more of the properties of one or more parameter lane control elements in response to an input changing a position of one or more parameter lane control elements relative to the associated parameter lane. The properties of one or more parameter lane control elements further include one or more of a position within the parameter lane or a connection to a parameter lane control element.

The one or more parameter lane control elements are icons having the form of one of a square, a diamond, a disc, and a line. Each clip is arranged in a track, and the track has parameters and/or properties. The clip includes a reference to the associated media element.

The clip includes a copy of the associated media element, and the copy has properties corresponding to the properties of the media element. Further, adjusting the parameters of the media element includes adjusting the parameters of the copy of the associated media element according to the parameters of the one or more parameter lane control elements associated with the clip corresponding to the media element.

The method further includes displaying within the interface one or more track controls. The one or more track controls include one or more of a balance control, a volume control (e.g., an amplitude slider), a panorama control (e.g., a panorama slider), a mute control, and a solo control. The method further includes displaying within the interface one or more track meters. The one or more track meters include one or more of a level meter, phase scope meter, and a spectrum meter. The method further includes displaying within the interface one or more navigation controls. The one or more navigation controls include one or more of a pan control, a zoom control, and a current time index control.

The method further includes displaying within the interface one or more audio controls. The one or more audio controls include one or more of a volume control (e.g., an amplitude slider), a panorama control, a balance control, an equalizer, and compressor settings. The method further includes outputting at least one of the one or more media elements. The outputting further includes providing the at least one of the one or more media elements as a data stream or as a data file.

In general, another innovative aspect of the subject matter described in this specification can be embodied in a system including one or more processors configured to interact to generate a user interface, the user interface including a timeline display including one or more clips, each clip being a visual representation of an associated media element; a plurality of selectively displayable parameter lanes, each parameter lane being associated with a first clip of the one or more clips, the first clip corresponding to a first media element, each parameter lane further being associated with a particular parameter of the first clip; one or more parameter lane control elements for each of the selectively displayable parameter lanes; and wherein two or more of the plurality of displayable parameter lanes are displayed concurrently; and parameters of the first media element are adjusted according to properties of the one or more parameter lane control elements in response to input modifying at least one of the one or more parameter lane control elements.

Particular embodiments of the subject matter described in this specification can be implemented so as to realize one or more of the following advantages. As used in the present specification, a parameter lane is a group of one or more keyframes associated with a clip and a timeline. In general, multiple parameter lanes can be displayed at the same time and in parallel, facilitating quick and easy editing of multiple keyframeable parameters without the need for switching between different modal or non-modal user interface elements (e.g., windows, dialogs, or tabs). Furthermore, multiple keyframeable parameters can be edited and adjusted in relation to each other. For example, keyframes within one parameter lane can be edited with respect to keyframes in another parameter lane. This can be done, for example, in order to synchronize time-dependent adjustments to different parameters or parameter lanes.

Keyframe controls can be edited, added, or removed not only at the same time, but adjustments can be made while maintaining an overview of the properties of other keyframe controls (for example number of keyframe controls, their positions and/or types, as well as other parameters). Thus, keyframe controls can be adjusted with respect to the timeline, other tracks and/or clips, keyframe controls within tracks/clips, and other display or control elements (for example waveform displays, audio/video streams, or video streams, etc.).

Keyframes can also be anchored to a clip. Thus, modifications to the clip (for example re-arrangement to a different time index within the timeline) are identically applied to keyframes associated with the clip (for example keyframes within a parameter lane associated with the clip). As a result, clips can be re-arranged without the need for applying the same modifications to any keyframes associated with the clip.

Clips can also be trimmed. If a clip is trimmed (e.g., the start or end of the clip is adjusted, resulting in parts of the clip being cut out), keyframes that are associated with a time index that falls within the portion being trimmed along with the source material are not included in further processing (e.g., such portions and keyframes are automatically ignored, for example, in a final mixdown). In traditional track-based keyframing systems, such keyframes are usually referred to as "orphaned" keyframes. A problem associated with orphaned keyframes is that the corresponding source material is no longer present or has been moved. As a result, such keyframes can inadvertently affect source material of other clips if not properly taken care of. In accordance with the present specification, such orphaned keyframes are automatically deleted or otherwise excluded from processing and cannot affect other clips in the timeline.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
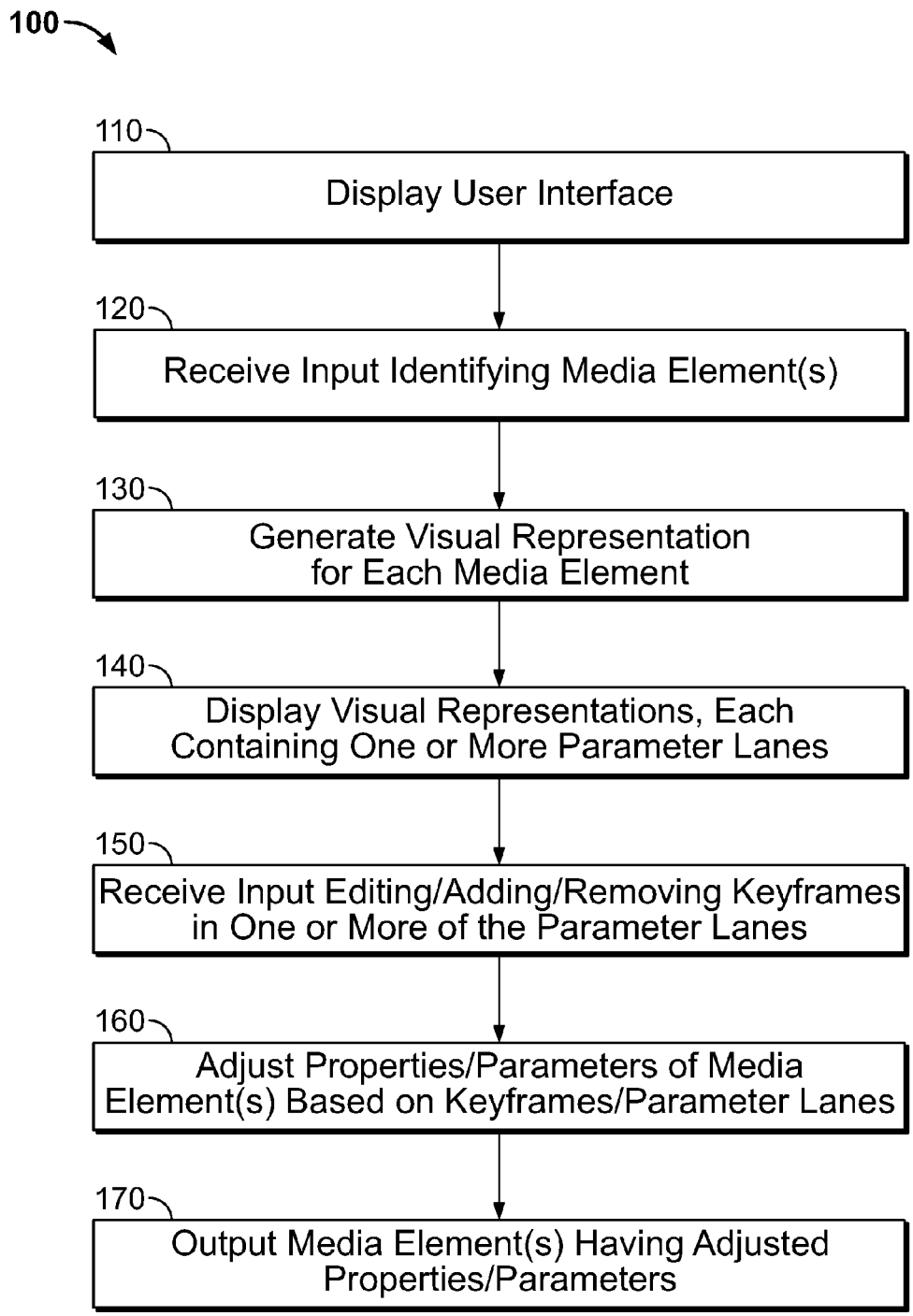
FIG. 1 is a flow chart showing an example process for editing keyframes and adjusting properties of media elements.

FIG. 1 is a flow chart showing an example process 100 for editing keyframes and adjusting properties of media elements. For convenience, the process 100 is described with respect to a system that performs process 100.

The system displays 100 a user interface. The user interface can provide various functionality associated with an audio editing application. Examples include opening and closing of files, resizing or maximizing the application window, and drag and drop functionality.

The system receives 120 input identifying media elements. A user can, for example, drag and drop one or more media elements (e.g. files containing audio data) into the user interface, e.g., into a particular region of the user interface. Alternatively, files can be opened, e.g., through a corresponding menu structure, to retrieve files including media elements from both local and remote locations. Other applications can provide media elements as input without interaction of a user.

The system generates 130 a visual representation for each identified media element. In some implementations, the media files are identified and visual representations generated in an iterative manner. Therefore, a user can, for example, drag and drop an audio file into the application window. In response to this dragging and dropping input, the system generates a visual representation of the selected media element. Subsequently, the user can add more media elements, for example, by dragging and dropping additional files into the application window. Each time, the system generates a corresponding visual representation. In some implementations, a visual representation either contains a reference to the media element or contains a copy of the media element.

As used in the present specification, a clip is a visual representation of a media element. A clip is associated with a media element and can include multiple parameter lanes. Each of the parameter lanes is associated with a parameter of the media element. Examples for parameters or properties include a volume, an intensity, a stereo width, and a panorama. In general, a parameter lane can contain one or more keyframes that are associated with a time index relative to the associated media element. Each keyframe has a type and a parameter value. A number of keyframes can be used to convey a time dependent series of parameter value changes. Keyframes can also be recorded with the corresponding audio content. For example, parameter lanes and the keyframes contained therein can provide additional control (e.g., read, write, touch) during recording of audio data.

The system displays 140 the clips in the user interface. Each clip can be displayed showing one or more parameter lanes concurrently. For example, a clip can be displayed with both an intensity parameter lane and a volume parameter lane. Each parameter lane optionally includes a number of keyframes. Alternatively, keyframes can be added to one or more parameter lanes as described below. Also, a clip can be shown with one or more associated parameter lanes hidden from view. In such a case, only the clip, optionally with individual distinguishable portions (e.g. intro, part 1, part 2, part 3, end) is displayed. Further, visual elements (e.g., windows, tabs, clips, controls, etc.) can be adjusted or modified in order to present information that is useful or necessary for user interaction.

The system receives 150 an input editing one or more parameter lanes. The input can be directed to one or more of the parameter lanes and can include editing, adding, or removing keyframes. Keyframes serve to modify parameters of the media elements that are associated with the clip. For example, user input may be directed at adding a number of keyframes to one or more parameter lanes and editing the added or existing keyframes. Editing keyframes can include, for example, adjusting the parameter values associated with the keyframes or adjusting the time indexes associated with the keyframes relative to each other and also relative to a timeline. A given keyframe can be edited multiple times. This way, a user can adjust the keyframes in several parameter lanes to his or her satisfaction, as the clip is updated with the result of the editing to provide feedback to the user. Examples of editing multiple parameter lanes in a single user interface are described in greater detail below with respect to FIGS. 5A to 5B.

The system adjusts 160 the properties and/or parameters of each media element based on the keyframes contained in the parameter lanes included in the clip that is associated with the respective media element. In some implementations, the user arranges multiple clips in relation to one another and in relation to the timeline. For example, the user can arrange multiple clips within one or more tracks. Typically, multiple clips arranged within a single track do not overlap. Additionally, multiple clips arranged within multiple tracks, each clip being assigned a single, individual track, can overlap. In some implementations, multiple clips arranged within a single track overlap and are cross-faded accordingly. Further, the user can modify keyframes in multiple parameter lanes contained in a number of clips.

Subsequently, the system adjusts the properties and/or parameters of the media element associated with each clip based on the keyframes contained in the parameter lanes of each clip. For example, a user can add three keyframes to the "Volume" parameter lane of a clip and edit the keyframes so as to effect a stepwise increase in volume. As a result, the system modifies the volume of the associated media element in a stepwise manner as defined by the keyframes added by the user (e.g., according to the position of the keyframes in the volume parameter lane).

The system outputs 170 the media element or elements in accordance with the keyframes contained in the parameter lanes associated with the corresponding clip. For example, a media element corresponding to audio data can be output using available audio circuitry of the system. Similarly, a media element corresponding to audio/video data can be output using available audio and video circuitry of the system. Additionally, output data can be stored for later use, either locally or remotely. The output can be stored, e.g., on computer readable media, for example a hard disk, optical or magneto-optical storage medium, or flash memory. Additionally, the output data can be further edited. For example, additional audio editing can be performed, for example, to modify other parameter or to add or remove audio effects. Additionally, the output data can be combined with other tracks to form a mix.

The steps as set forth above and as illustrated in FIG. 1 are not restricted to a consecutive order. For example, media elements can be added or removed from a set of media elements basically at any point in time. Typically, while editing keyframes, the user will repeatedly require media elements to be output (e.g. played back using audio/video circuitry of the system) or displayed in order to assess the quality of the editing and check whether the desired result has been achieved. Therefore, the system can process user input that is received, for example, in steps 120 or 150, throughout the process.

Figure 2:
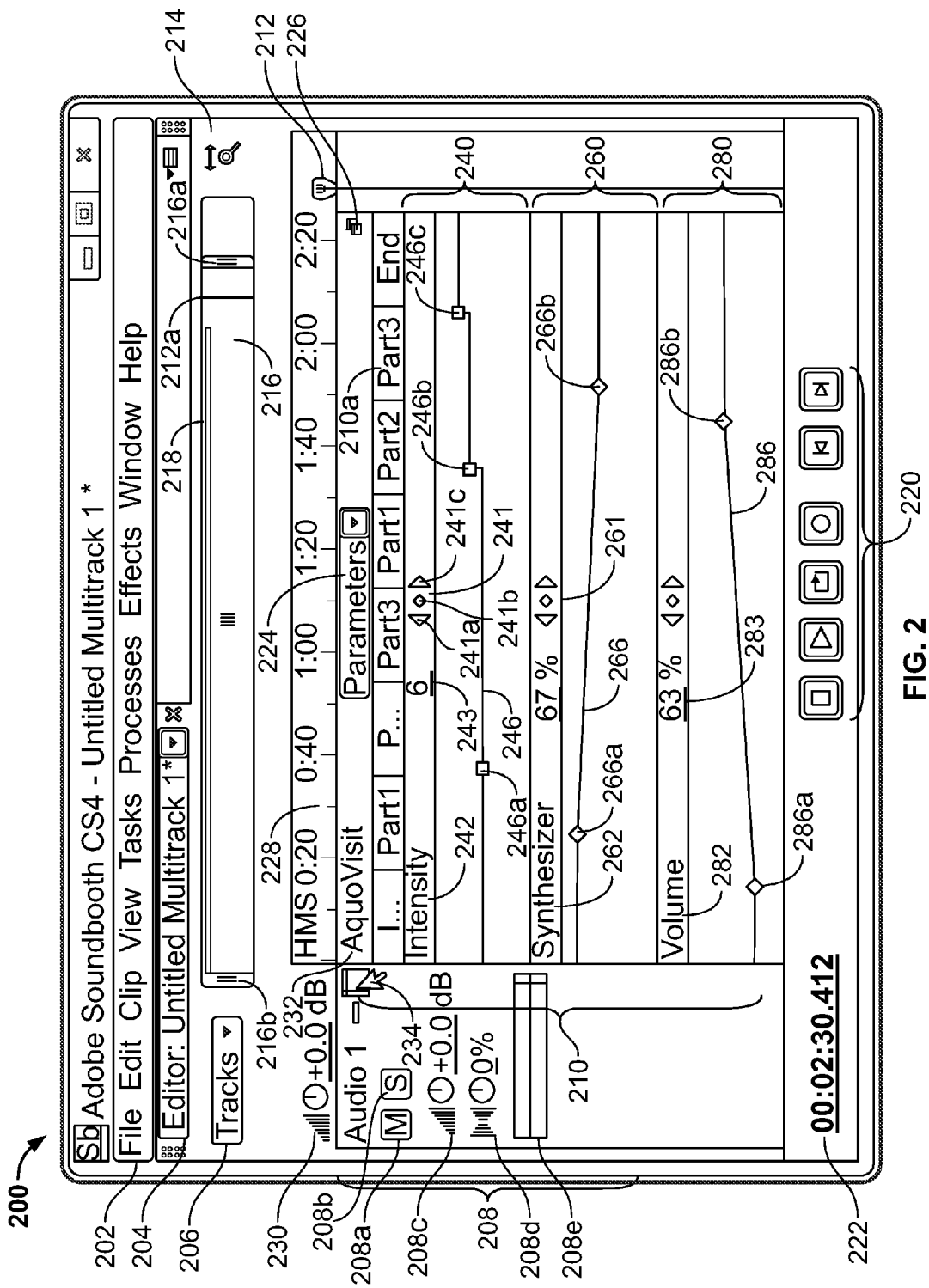
FIG. 2 is an illustration of an example user interface of a keyframe parameter editor showing multiple parameter lanes.

FIG. 2 is an illustration of an example user interface 200. The user interface 200 provides for the visualization of audio data within a timeline environment. The user interface 200 is provided, for example, as part of a system including a digital audio work station (DAW).

In some implementations, the user interface 200 displays several control elements, including a menu bar 202 and dropdown list controls 204 and 206. The dropdown list controls 204 and 206 serve in the selection of multiple tracks and single tracks respectively. Further, a slider control 216 allows for horizontal scrolling along the timeline. The size and position of the slider control 216 indicate the size and extent of a current view provided by the interface, relative to a timeline 228 shown below slider control 216. A zoom-out-full control 214 allows for adjusting the zoom level in order to gain an overview of the extend of all clips displayed in relation to the timeline 228.

In some implementations, main controls 230 allow for overall adjustments of the audio parameters. Similarly, track controls 208a to 208e, displayed within track 208, allow for track specific adjustment of audio parameters. For example, track controls can include a mute control 208a, a solo control 208b, an amplitude slider control 208c, a panorama slider control 208d. Track controls 208a to 208e can further include one or more audio meters, for example, a mono or stereo level meter 208e.

Generally, a clip 210 can be shown within timeline 228. Additionally, the clip 210 can include individual parts 210a. Further, a clip can include multiple parameter lanes, for example parameter lanes 240, 260, 280, as shown within clip 210. As shown in FIG. 2, the visual representation of a media element (e.g., clip 210) includes a title 232 within a title bar, a parameters dropdown list control 224, and a maximize control 226. Other display elements or controls may be provided.

The timeline also includes a linearly adjustable (e.g., horizontally adjustable, as shown here in FIG. 2) current time index (CTI) control 212. The CTI control 212 is positioned outside the single clip 210 and within the displayed track 208 at a relative time of approximately two minutes and 30 seconds (as shown on the lower left hand side of the interface 200). The CTI control 212 is further shown as a vertical bar 212a within the slider control 216. The interface 200 includes a numerical value 222 of the CTI control 212. Further, the interface 200 provides generic playback and recording controls 220.

In general, the interface 200 can display multiple parameter lanes at the same time and in parallel, facilitating quick and easy editing of multiple keyframeable parameters without the need for switching between different modal or non-modal user interface elements (e.g., windows, dialogs, and tabs). The display size of individual parameter lanes 240, 260, 280 can be adjusted within the limits of the display area of interface 200 and/or clip 210.

In some implementations, interface 200 displays multiple parameter lanes concurrently so as to facilitate editing of keyframeable parameters in multiple parameter lanes at the same time and in relation to each other. Editing of keyframeable parameters can be achieved for example using keyframe controls as described further below. Each of the multiple parameter lanes is typically associated with a specific parameter type. Parameter types can include, for example volume or intensity. Other examples include different input channels as used for different audio sources in a mixer setting (e.g., strings, piano, or vocals). In such cases, the media elements can include different channels containing audio data that can be edited separately from each other. In some implementations, input channel type parameter lanes and audio properties (e.g. volume, intensity, etc.) parameter lanes are distinguished from one another.

Further, keyframe controls can be edited, added, or removed not only at the same time, but adjustments can be made while maintaining an overview of the properties of other keyframe controls (e.g., the number of keyframe controls, their positions, and their types). Thus, keyframe controls can be adjusted with respect to the timeline, with respect to other tracks and/or clips, with respect to keyframe controls within tracks/clips, and/or with respect to other display or control elements (e.g., waveform displays, audio/video streams, or video streams).

Examples for adjustments that can require coordinated adjustments in several parameter lanes can include linearly decreasing the overall volume of a clip, while increasing the volume of individual components. In this way, for example, single or multiple components in a clip (e.g., strings, piano, or vocals) can be emphasized in relation to the remaining components of the clip, while maintaining the perceived loudness of the overall clip (i.e. keeping the clip at subjectively the same volume level).

In some implementations, keyframeable parameters are anchored relative to the clip, instead of being anchored relative to the timeline or a track. This facilitates clip-oriented management of keyframeable parameters. For example, clips can be edited, moved, adjusted or otherwise re-arranged within one or more tracks, without the requiring subsequent modification of keyframeable parameters (e.g., keyframe controls). In other words, if a clip is re-arranged within the timeline, all keyframe controls contained in the clip (or contained within parameter lanes that are contained in the clip) are re-arranged accordingly. Thus, the keyframe controls are not modified in relation to the clip, but in relation to the timeline or track, therefore not requiring any adjustments or modification to the keyframe controls due to the re-arranging of the clip.

The interaction with and the functionality of individual parameter lanes is described with respect to the "Intensity" parameter lane 240 in reference to FIGS. 4A to 4D. However, it should be understood that parallel or concurrent editing within a number parameter lanes is generally achieved in the same or a similar manner as described in reference to the particular examples displayed in FIGS. 4A to 4D.

In some implementations, keyframe control elements have different shapes (e.g., a quadratic shape, a rectangular shape, a diamond shape, or a circular shape). In some implementations, the shape of a keyframe control element indicates specific properties of the keyframe control element and/or the corresponding parameter lane. In the example shown in FIG. 2, keyframe control element 246a has a quadratic shape and keyframe control element 266a has a diamond shape.

In some implementations, a quadratic shape may be associated with a hold keyframe (e.g., holding a constant value level between keyframes) and a diamond shape may be associated with a linear interpolation (e.g., linearly interpolating value levels between keyframes). A hold-keyframe may be associated with keeping a parameter value at a constant level from the time index associated with the keyframe control and the time index associated with the subsequent keyframe control or the end of the associated clip (e.g., a step function). A linear interpolation keyframe control may be associated with adjusting a parameter value linearly between the time index associated with the keyframe control and the time index associated with the subsequent keyframe control.

In some implementations, interface 200 displays parameter lanes within clip 210 as shown in FIG. 2. Here, each parameter lane has further display elements. For example, "Intensity" parameter lane 240 has a title element 242, one or more keyframe control elements 246, and a display element 243. Further, parameter lane 240 has keyframe navigation controls 241, including three separate controls, namely "previous" keyframe control 241a, "add/remove" keyframe control 241b, and "next" keyframe control 241c. Other lanes may have the same (for example title elements 262 and 282, display elements 263 and 283, keyframe navigation controls 261 and 281, keyframe control elements 266 and 286, or other elements. The size of the clip can be adjusted, for example with the maximize control 226, or any of the zoom controls (e.g., zoom-out-full control 214). Adjusting the size of slider control 216 (e.g., by adjusting either or both of controls 216a and 216b) also changes the size of all clips displayed within interface 200.

Figure 3:
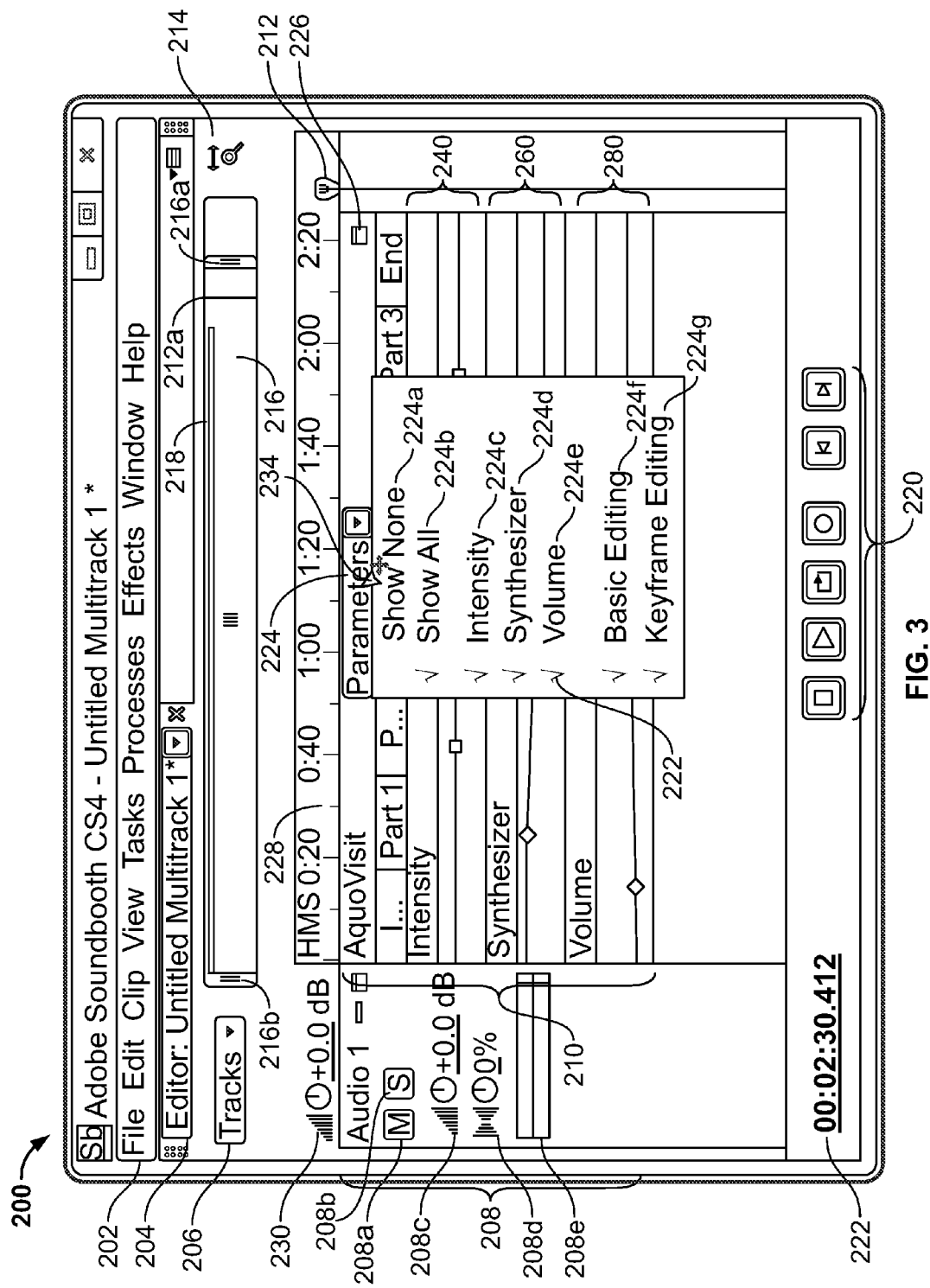
FIG. 3 is an illustration of an example user interface of a keyframe parameter editor showing options for displaying multiple parameter lanes.

FIG. 3 is another illustration of an example user interface 200, in which multiple parameter lanes 240, 260, 280 are shown within clip 210. In this example, parameters drop down list control 224 is shown in an activated state, displaying generic options 224a, 224b, 224f, and 224g, and parameter options 224c, 224d, and 224e. In some implementations, there can be multiple parameter options, including one or more of: Volume, Intensity, Lead, Background, Background 1, Background 2, Synthesizer, Synth 1, Synth 2, Rain, Construction, Flute, Piano, Piano 1, Piano 2, Guitar, Melody, Strings, Solo, Vocal, Oboe, Percussion, Bells, Strings, Choir, Environment, Clarinet, and Harmony. Other parameter options can be provided.

In the example shown in FIG. 3, three parameter options are selected, namely Intensity 224c, Synthesizer 224d, and Volume 224e. Upon selection of any of these parameter options, the respective option is checked/unchecked and the display of corresponding parameter lane below clip 210 is toggled accordingly. Each parameter lane that is displayed can be used to edit/add/remove keyframe controls that serve to adjust parameters of the media element associated with the clip 210. For example, if parameter lane 280 is selected for display (e.g., the corresponding option 224e is checked in parameter dropdown list 224), the user can adjust the volume of the media element associated with clip 210 by editing/adding/removing keyframe controls 286a, 286b, etc. as displayed in parameter lane 280 (see FIG. 2).

In some implementations, the display of all parameter lanes (e.g. lanes 224c, 224d, 224e) is toggled with generic options 224a and 224b, switching the display of all parameter lanes respectively on or off.

Further, in some implementations, other options are available, for example, options switching to basic editing 224f, or switching to keyframe editing 224g. In general, the number of options and/or parameter lanes is not limited in any particular way, other than, for example by the amount of available memory, processing power, or addressable display area.

FIGS. 4A to 4D illustrate several editing steps within a parameter lane, e.g., parameter lane 240 shown in FIG. 2. The shape of cursor 234 may change depending on the position within the interface 200. For example, the cursor 234 may change to a cross-hair shape when positioned within a parameter lane (e.g., parameter lane 240). Further, the shape of cursor 234 can change upon positioning of the cursor over certain display elements or controls (e.g., keyframe control 246a).

FIGS. 4A to 4D show an enlarged view of clip 210 within user interface 200. For illustration purposes, only parameter lane 240 is shown within clip 210. In this example, "Intensity" parameter lane 240 is shown enlarged as compared to clip 210. In this example, interface 200 does not display other parameter lanes. Generally, the size of any parameter lane or the clip 210 can be adjusted in order to facilitate adequate display of keyframe controls or other elements, and/or in order to facilitate interaction with one or more controls or elements at a greater or reduced level of detail.

Figure 4A:
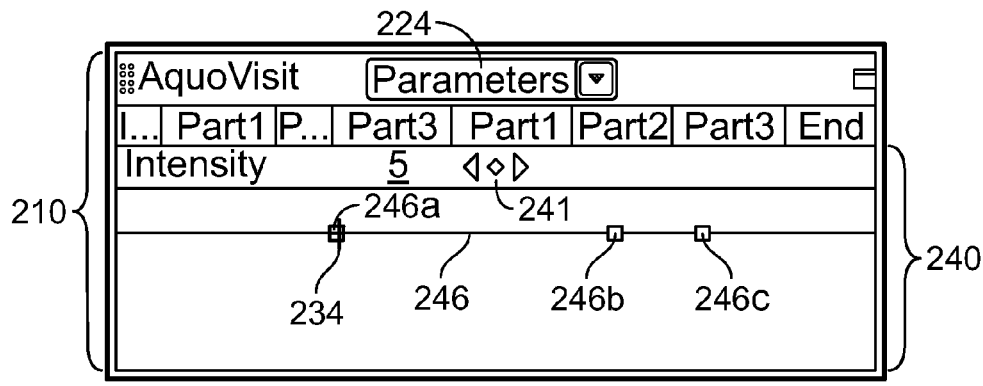
FIGS. 4A to 4D illustrate several example editing steps of keyframe controls within a single "Intensity" parameter lane of an example clip.

In the example shown in FIG. 4A, the "Intensity" level of clip 210 is constant for the entire duration of clip 210. Here, a single horizontal line control 246 indicates the level visually, whereas three keyframe controls 246a, 246b, and 246c are positioned along the line 246, located at different time indexes. In this example, keyframe controls 246a, 246b, and 246c are of the type hold-keyframe. Thus, a parameter value, here the level of intensity, is maintained at a constant level between consecutive keyframes and is adjusted at each keyframe to the associated parameter value. The parameter lane 240 shows that all three keyframe controls 246a, 246b, and 246c are positioned at the same vertical position. Thus, the level of intensity is constant over the entire duration of the parameter lane 240 and clip 210.

Parameter values can be adjusted in multiple ways. For example, the position of existing keyframe controls can be adjusted. Keyframe controls can be added to or removed from a parameter lane.

Adjusting parameter values by adjusting existing keyframe controls can be achieved by adjusting the position of a keyframe control. The horizontal position of a keyframe control is associated with the time index relative to the clip, i.e. the beginning and duration of the clip. Moving a keyframe control horizontally allows for the adjustment of the time index associated with the keyframe control. In case of a hold-keyframe this is the time index at which the corresponding parameter value is coming into effect. Moving a keyframe control vertically allows for adjusting the parameter value itself. For example, moving a keyframe control up increases the associated parameter value and moving the keyframe control down decreases the associated parameter value.

Figure 4B:
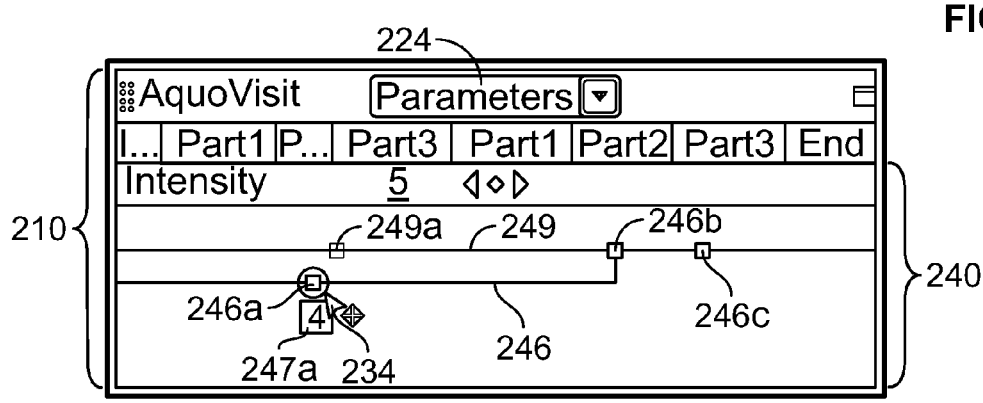

FIG. 4B illustrates an example modification of the position of the keyframe control 246a. A user may select keyframe control 246a by positioning the cursor 234 over the keyframe control 246a and clicking an associated button on a suitable input device (e.g. a mouse, trackball, etc.). In some implementations, the visual appearance of the keyframe control 246a is changed to visually indicate a status change (e.g. active/inactive or selected/unselected) to the user. For example, as shown in FIG. 4B, the keyframe control 246a is highlighted in a particular color and a glow-type visual effect is applied. Other visual effects may be provided, for example to provide visual feedback to the user. In some implementations, a focus is assigned to any single parameter lane (e.g., any of parameter lanes 240, 260, 280 in this example). Visual feedback (for example a different colored background, frame, or title) can indicate that the focus is assigned to a particular parameter lane. For example, parameter lane 240 can contain an additional frame or a frame having a different color, in order to indicate that the focus is assigned to parameter lane 240.

In some implementations, when the focus is assigned to a parameter lane, user input (for example key strokes) are processed with a context associated with the parameter lane having the focus. In some implementations, pressing one of the left and right arrow keys results in the CTI control 212 being moved left or right, respectively. In some implementations, the movement of the CTI control 212 in response to keyboard input can be restricted to existing keyframes. For example, pressing one of the left and right arrow keys can allow the user to move the CTI control 212 the time index associated with the previous/next keyframe control located to the left or right from the current position of the CTI control 212. In some implementations, upon selection of a keyframe control, the user can move the keyframe control horizontally and/or vertically by pressing one of the left/right/up/down arrow keys while holding down a modifier key (e.g., the ALT modifier key). Other modifier keys can be associated with other or additional functionality, e.g., adding or removing keyframe controls with the shift modifier key or the CTRL modifier key.

By dragging the keyframe control 246a vertically downwards, the associated parameter value (here "Intensity") can be decreased. In some implementations, the current parameter value is displayed concurrently in a tool-tip style display element (e.g., element 247a as shown in FIG. 4B). In this example, not only is the keyframe control 246a dragged vertically downwards, but also horizontally to the left, thereby adjusting the time index associated with the keyframe control 246a to an earlier point in time.

In some implementations, as the keyframe control 246a is moved, linear element 246 is adjusted accordingly, depending on the type of the keyframe control 246a. The linear element 246 associated with a hold-keyframe (e.g., keyframe control 246a) is moved vertically according to the keyframe control 246a. The subsequent keyframe control 246b remains at its position, so that line element 246 continues horizontally along the vertical position of keyframe control 246a up to the time index associated with keyframe control 246b. At this time index, the line element 246 has a vertical shape, indicating that the line element 246 continues at the vertical position of keyframe control 246b from the time index on that is associated with keyframe control 246b.

In some implementations, interface 200 keeps displaying the previous position of a keyframe control that is being adjusted while the adjustment is taking place. In FIG. 4B, interface 200 keeps displaying the previous position 249a of keyframe control 246a. The previous position 249a can be displayed visually different from the appearance of keyframe control 246a, for example, using a different opacity. In a similar manner, interface 200 may keep displaying the previous shape, position, or form 249 of linear element 246 during the time keyframe control 246a is being modified.

Figure 4C:
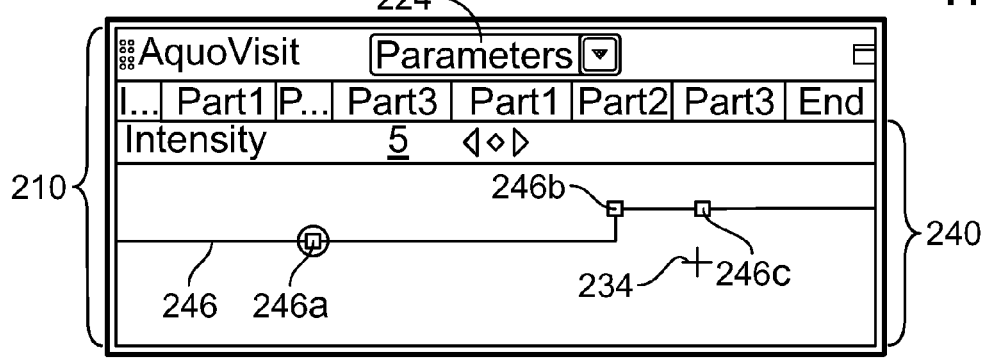

FIG. 4C illustrates selected parameter lane 240, containing selected keyframe control 246a and unselected keyframe controls 246b and 246c, as well as line element 246, after the adjustment of the position of keyframe control 246a as described with reference to FIG. 4B. In some implementations, selected elements (for example keyframe control 246a and/or parameter lane 240) remain selected until user input selecting a different element or control is received.

Figure 4D:
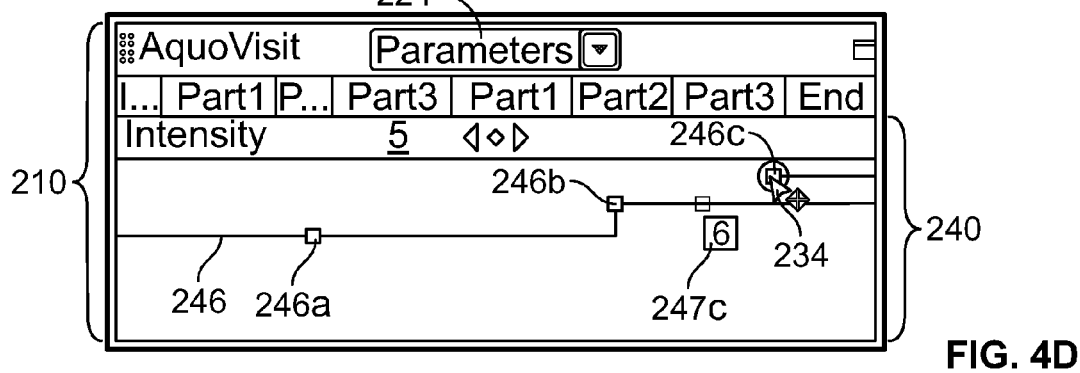

FIG. 4D illustrates an example modification of the position of the keyframe control 246c, similar to the example modification of the position of the keyframe control 246a as shown in FIG. 4B. Here, dragging the keyframe control 246c vertically upwards, increases the associated parameter value. In this example, the current parameter value is displayed concurrently in a tool-tip style display element 247c. Further, dragging keyframe control element 246c horizontally to the right adjusts the time index associated with the keyframe control 246c to a later point in time.

Accordingly, movement of keyframe control 246c adjusts line element 246. Generally, line element 246 indicates the intensity level (the parameter value associated with parameter lane 240) of the clip from the beginning of the clip (for example, time index 00:00:00 within the clip), up to the time index of the first keyframe control, namely keyframe control 246a, where the intensity level is adjusted to the value associated with keyframe control 246a. In some implementations, the parameter value is kept constant at the level associated with the first keyframe (i.e., the keyframe control associated with the lowest time index) in a parameter lane for the time prior to the time index associated with the first keyframe. Between the time index associated with keyframe control 246a and the time index associated with keyframe control 246b, the intensity level is maintained at a constant value associated with keyframe control 246a.

At the time index associated with keyframe control 246b, the intensity level is adjusted to the value associated with keyframe control 246b. Accordingly, between the time index associated with keyframe control 246b and the time index associated with keyframe control 246c, the intensity level is kept constant at the value associated with keyframe control 246b. At the time index associated with keyframe control 246c, the intensity level is adjusted to the value associated with keyframe control 246c. Similarly, additional keyframe controls could be created in parameter lane 240. Finally, between the time index associated with the last keyframe control (i.e., the keyframe control associated with the highest time index) and the end of the clip, the intensity level is kept constant at the value associated with the keyframe control having the highest time index.

As indicated above, different parameter lanes can provide different functionality associated with time-dependent adjustment of parameter values. For example a hold-keyframe may be associated with keeping a parameter value at a constant level from the time index associated with the keyframe control and the time index associated with the subsequent keyframe control or the end of the associated clip, as described above in reference to FIGS. 4A to 4D.

Likewise, a linear interpolation keyframe control may be associated with adjusting a parameter value linearly between the time index associated with the keyframe control and the time index associated with the subsequent keyframe control. Here, the parameter values between consecutive keyframe controls are linearly interpolated. As shown in parameter lanes 260 and 280 in FIG. 3, parameter values are interpolated between keyframe controls (for example keyframe controls 266a and 266b, or keyframe controls 286a and 286b).

In some implementations, other time-dependent adjustments of parameter values are provided, for example, based on parametric curves (for example Bezier-curves) or linear and non-linear equations.

In some implementations, keyframe controls are added and removed in response to user input selecting the "add/remove" keyframe control 241b (see also FIG. 2) in combination with the position of the CTI control 212 and the parameter lane currently having the focus. If the CTI control 212 is positioned at the time index associated with a keyframe control within the parameter lane having the focus, then this specific keyframe control can be removed in response to user input selecting the "add/remove" keyframe control 241b. A user can, for example, position the CIT control 212 on and move the CTI control 212 between existing keyframe controls by activating the "previous" keyframe 241a and "next" keyframe 241c controls.

Within the parameter lane having the focus, the CTI control 212 is moved to the time index associated with a subsequent or later keyframe control (i.e., a keyframe control associated with a higher time index) upon activation of control 241c. Likewise, within the parameter lane having the focus, the CTI control 212 is moved to the time index associated with a previous or earlier keyframe control (i.e., a keyframe control associated with a lower time index) upon activation of control 241a. If no previous or next (i.e. earlier or later) keyframe control is present in the parameter lane having the focus, the CTI control 212 may be positioned at the beginning or end of the clip, or at other time indexes.

In some implementations, clip based controls (not shown) corresponding to controls 241a, 241b, and 241c are provided, which allow for overall movement between keyframe controls contained in different parameter lanes, not just within a single parameter lane having the focus.

In some implementations, other controls are provided for editing/adding/removing keyframe controls, for example pop-up menus or keyboard short-cuts.

Figure 5A:
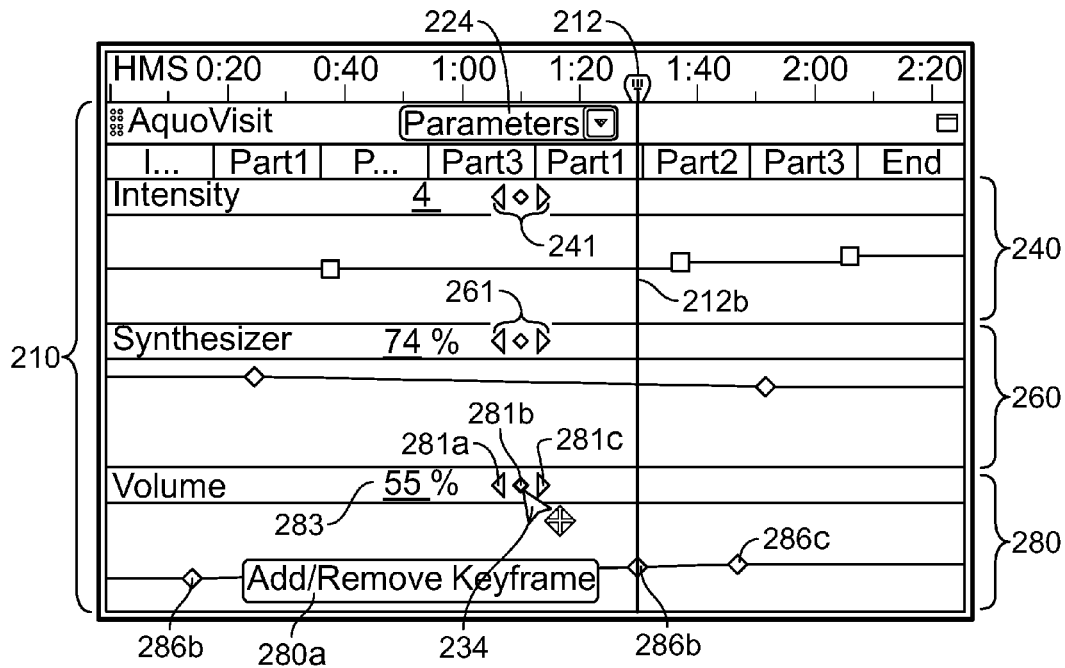
FIGS. 5A and 5B illustrate example editing steps of keyframe controls within a multiple parameter lanes of an example clip.
Figure 5B:
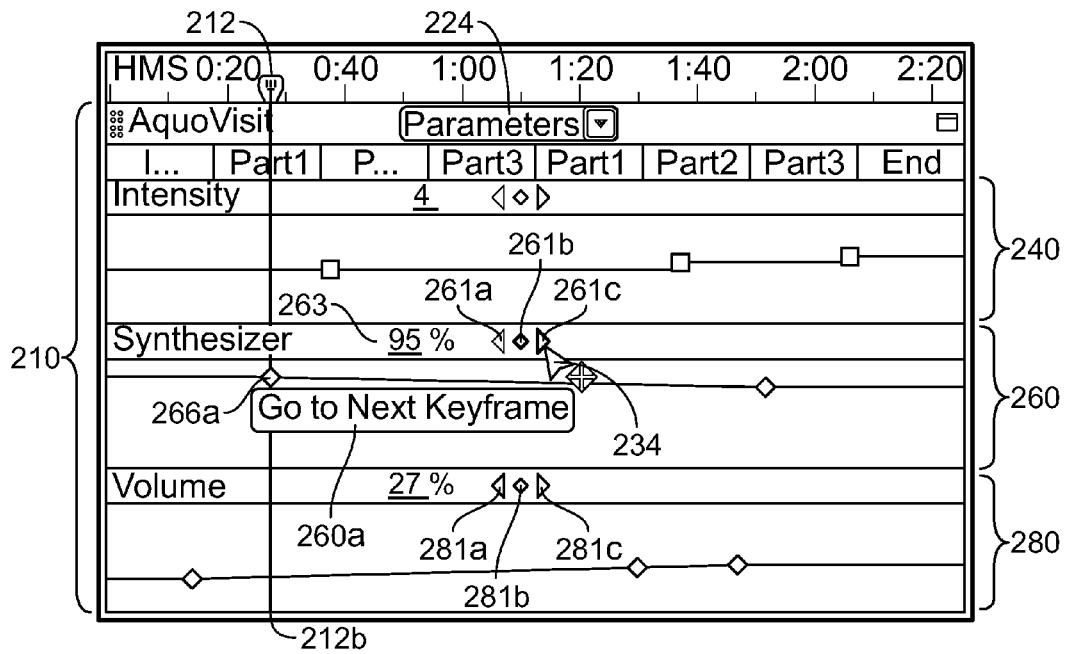

FIGS. 5A and 5B illustrate example editing of keyframe controls within multiple parameter lanes of an example clip.

FIG. 5A shows an enlarged view of clip 210 within user interface 200. In this example, parameter lanes 240, 260, and 280 are shown concurrently within clip 210.

There are several possibilities to add/remove keyframe controls within a parameter lane. One technique includes keyframe navigation controls, for example, keyframe navigation controls 281 (i.e., keyframe navigation controls 281a, 281b, and 281c). The process is described with reference to FIG. 5A and in reference to parameter lane 280. It should be understood that this process is applicable to other parameter lanes (e.g., parameter lanes 240 and 260 in combination with keyframe navigation controls 241 and 261 respectively).

The user can position CTI control 212 at a certain time index, also denoted by vertical line 212b, namely the time index where a keyframe control is to be added/removed. In response to the user selecting keyframe navigation control 281b, the "add/remove keyframe" control, keyframe control 286b is created, as shown in FIG. 5A. Accordingly, if keyframe control 286b had already been existing at the time index denoted by CTI control 212, a selection of keyframe navigation control 281b would have resulted in keyframe 286b being removed from parameter lane 280. A tool-tip (e.g., tool-tip 280a) may be displayed upon positioning of cursor 234 over a control element (e.g., keyframe navigation control 281b).

Alternatively, the user can position cursor 234 over a portion of linear element 286. Upon selection of linear element 286, a keyframe control can be created. Depending on the selection (e.g., activation of a control button of a pointing device), a pop-up menu may be displayed, providing several options, including adding and removing keyframe controls. Other ways to add/remove keyframes may be provided. For example, the user may use a pointing device to point to an area between two keyframes within a parameter lane. Activating associated input means (e.g., clicking a mouse button or a button on a trackball device) then adds a keyframe to the parameter lane. The system then integrates the newly added keyframe control into the parameter lane by adjusting the parameters of the keyframe in accordance with its position within the parameter lane and by providing corresponding line elements connecting the keyframe with existing keyframes.

Navigating between keyframe controls is described with reference to FIG. 5B and in reference to parameter lane 280. Keyframe navigation controls 281 can be used to navigate between keyframes contained in parameter lane 280. Selecting keyframe navigation control 281a (i.e. the "previous" keyframe navigation control) serves to position the CTI control 212 at the time index which the keyframe located to the left from the current position of CTI control 212 is associated with. If there is no keyframe control positioned left of CTI control 212, keyframe navigation control 281a cannot be selected and/or the current position of CTI control 212 is not modified.

Likewise, selecting keyframe navigation control 281c (i.e. the "next" keyframe navigation control) serves to position the CTI control 212 at the time index that the keyframe located to the right from the current position of CTI control 212 is associated with. If there is no keyframe control positioned right of CTI control 212, keyframe navigation control 281a cannot be selected and/or the current position of CTI control 212 is not modified.

An example for a keyframe navigation control that cannot be selected is shown in FIG. 5B. Here, keyframe navigation control 261a, associated with parameter lane 260, cannot be selected. As shown, the visual appearance of an inactive control element may indicate this state.

Figure 6:
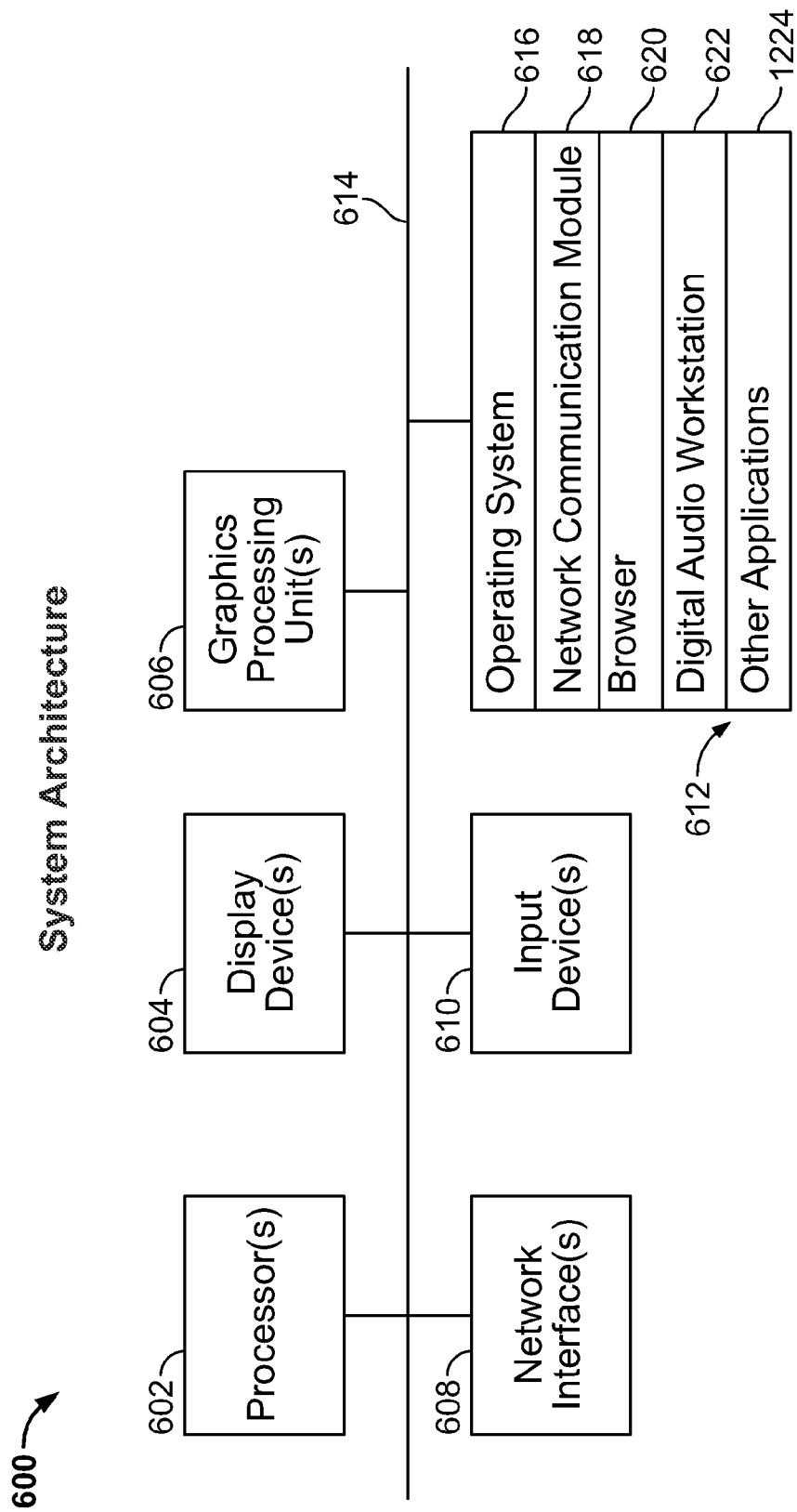
FIG. 6 is a block diagram of an exemplary user system architecture.

FIG. 6 is a block diagram of an exemplary user system architecture 600. The system architecture 600 is capable of hosting a audio processing application that can electronically receive one or more media elements and display and edit visual representations thereof. The architecture 600 includes one or more processors 602 (e.g., IBM PowerPC, Intel Pentium 4, etc.), one or more display devices 1404 (e.g., CRT, LCD), graphics processing units 606 (e.g., NVIDIA GeForce, etc.), a network interface 608 (e.g., Ethernet, FireWire, USB, etc.), input devices 610 (e.g., keyboard, mouse, etc.), and one or more computer-readable mediums 612. These components exchange communications and data via one or more buses 614 (e.g., EISA, PCI, PCI Express, etc.).

The term "computer-readable medium" refers to any medium that participates in providing instructions to a processor 602 for execution. The computer-readable medium 612 further includes an operating system 616 (e.g., Mac OS®, Windows®, Linux, etc.), a network communication module 618, a browser 620 (e.g., Safari®, Microsoft® Internet Explorer, Netscape®, etc.), a digital audio workstation 622, and other applications 624.

The operating system 616 can be multi-user, multiprocessing, multitasking, multithreading, real-time and the like. The operating system 616 performs basic tasks, including but not limited to: recognizing input from input devices 610; sending output to display devices 604; keeping track of files and directories on computer-readable mediums 612 (e.g., memory or a storage device); controlling peripheral devices (e.g., disk drives, printers, etc.); and managing traffic on the one or more buses 614. The network communications module 618 includes various components for establishing and maintaining network connections (e.g., software for implementing communication protocols, such as TCP/IP, HTTP, Ethernet, etc.). The browser 620 enables the user to search a network (e.g., Internet) for information (e.g., digital media items).

The digital audio workstation 622 provides various software components for performing the various functions for receiving media elements, generating clips, displaying the user interface including display and control elements, receiving user input, adjusting parameters of the media elements, and providing output, as described with respect to FIGS. 1-5B, including interaction with the user interface, clips, parameter lanes and the editing of keyframes and other control elements.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. The display device can be of a kind having integrated input means or pointing device, e.g., a touch screen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
receiving one or more media elements including audio data, the one or more media elements having associated parameters;
generating a clip for each media element, each clip being a visual representation of an associated media element;
displaying an interface for representing each clip relative to a timeline;
responsive to a first selection of a first audio parameter, displaying in the interface a first parameter lane associated with a first clip and having associated first parameter lane control elements, wherein a particular first parameter lane control element is associated with a first shape and wherein the first shape indicates a property of the particular first parameter lane control element;
responsive to a second selection of a second audio parameter, displaying in the interface a second parameter lane while the first parameter lane remains displayed, the second parameter lane being associated with the first clip and having associated second parameter lane control elements, wherein a particular second parameter lane control element is associated with a second shape, wherein the second shape indicates a property of the particular second parameter lane control element, wherein the first and second shapes are different and the respective indicated properties are different, and wherein the first shape indicates a hold keyframe between parameter lane control elements and the second shape indicates a linear interpolation between parameter lane control elements;
receiving an input modifying one or more of the first and second parameter lane control elements; and
adjusting the parameters of the media element associated with the first clip according to one or more properties of the first and second parameter lane control elements.

2. The method of claim 1, where each parameter lane is associated with a keyframeable parameter.

3. The method of claim 2, where the keyframeable parameter is selected from the group consisting of intensity, volume, synthesizer, lead, background, rain, construction, flute, piano, guitar, melody, strings, solo, vocal, oboe, percussion, bells, strings, choir, environment, clarinet, and harmony.

4. The method of claim 1, where adjusting the parameters of the media element further comprises:
adjusting the properties of one or more parameter lane control elements in response to an input changing one or more of the properties of one or more parameter lane control elements.

5. The method of claim 4, further comprising:
changing one or more of the properties of one or more parameter lane control elements in response to an input changing a position of one or more parameter lane control elements relative to the associated parameter lane.

6. The method of claim 5, where the properties of one or more parameter lane control elements further comprise one or more of a position within the parameter lane or a connection to a parameter lane control element.

7. The method of claim 1, where the one or more parameter lane control elements include one or more of a hold-keyframe control, a linear interpolation control, a navigation control, and an edit control.

8. The method of claim 1, wherein the first shape and the second shape are selected from the group consisting of a quadratic shape, a diamond, a rectangular shape and a circular shape.

9. A computer program product, encoded on a non-transitory computer readable storage medium, operable to cause a data processing apparatus to perform operations comprising:
receiving one or more media elements including audio data, the one or more media elements having associated parameters;
generating a clip for each media element, each clip being a visual representation of an associated media element;
displaying an interface for representing each clip relative to a timeline;
responsive to a first selection of a first audio parameter, displaying in the interface a first parameter lane associated with a first clip and having associated first parameter lane control elements, wherein a particular first parameter lane control element is associated with a first shape and wherein the first shape indicates a property of the particular first parameter lane control element;
responsive to a second selection of a second audio parameter, displaying in the interface a second parameter lane while the first parameter lane remains displayed, the second parameter lane being associated with the first clip and having associated second parameter lane control elements, wherein a particular second parameter lane control element is associated with a second shape, wherein the second shape indicates a property of the particular second parameter lane control element, wherein the first and second shapes are different and the respective indicated properties are different, and wherein the first shape indicates a hold keyframe between parameter lane control elements and the second shape indicates a linear interpolation between parameter lane control elements;
receiving an input modifying one or more of the first and second parameter lane control elements; and
adjusting the parameters of the media element associated with the first clip according to one or more properties of the first and second parameter lane control elements.

10. The computer program product of claim 9, where each parameter lane is associated with a keyframeable parameter.

11. The computer program product of claim 10, where the keyframeable parameter is selected from the group consisting of intensity, volume, synthesizer, lead, background, rain, construction, flute, piano, guitar, melody, strings, solo, vocal, oboe, percussion, bells, strings, choir, environment, clarinet, and harmony.

12. The computer program product of claim 9, where adjusting the parameters of the media element further comprises:
adjusting the properties of one or more parameter lane control elements in response to an input changing one or more of the properties of one or more parameter lane control elements.

13. The computer program product of claim 12, further operable to cause data processing apparatus to perform operations comprising:
changing one or more of the properties of one or more parameter lane control elements in response to an input changing a position of one or more parameter lane control elements relative to the associated parameter lane.

14. The computer program product of claim 13, where the properties of one or more parameter lane control elements further comprise one or more of a position within the parameter lane or a connection to a parameter lane control element.

15. The computer program product of claim 9, where the one or more parameter lane control elements include one or more of a hold-keyframe control, a linear interpolation control, a navigation control, and an edit control.

16. A system comprising:
one or more processors configured to perform operations comprising:
receiving one or more media elements including audio data, the one or more media elements having associated parameters;
generating a clip for each media element, each clip being a visual representation of an associated media element;
displaying an interface for representing each clip relative to a timeline;
responsive to a first selection of a first audio parameter, displaying in the interface a first parameter lane associated with a first clip and having associated first parameter lane control elements, wherein a particular first parameter lane control element is associated with a first shape and wherein the first shape indicates a property of the particular first parameter lane control element;
responsive to a second selection of a second audio parameter, displaying in the interface a second parameter lane while the first parameter lane remains displayed, the second parameter lane being associated with the first clip and having associated second parameter lane control elements, wherein a particular second parameter lane control element is associated with a second shape, wherein the second shape indicates a property of the particular second parameter lane control element, wherein the first and second shapes are different and the respective indicated properties are different, and wherein the first shape indicates a hold keyframe between parameter lane control elements and the second shape indicates a linear interpolation between parameter lane control elements;
receiving an input modifying one or more of the first and second parameter lane control elements; and
adjusting the parameters of the media element associated with the first clip according to one or more properties of the first and second parameter lane control elements.

17. The system of claim 16, where each parameter lane is associated with a keyframeable parameter.

18. The system of claim 17, where the keyframeable parameter is selected from the group consisting of intensity, volume, synthesizer, lead, background, rain, construction, flute, piano, guitar, melody, strings, solo, vocal, oboe, percussion, bells, strings, choir, environment, clarinet, and harmony.

19. The system of claim 16, where adjusting the parameters of the media element further comprises:
adjusting the properties of one or more parameter lane control elements in response to an input changing one or more of the properties of one or more parameter lane control elements.

20. The system of claim 19, further configured to perform operations comprising:
changing one or more of the properties of one or more parameter lane control elements in response to an input changing a position of one or more parameter lane control elements relative to the associated parameter lane.

21. The system of claim 20, where the properties of one or more parameter lane control elements further comprise one or more of a position within the parameter lane or a connection to a parameter lane control element.

22. The system of claim 16, where the one or more parameter lane control elements include one or more of a hold-keyframe control, a linear interpolation control, a navigation control, and an edit control.

* * * * *